US005629037A

United States Patent [19]
Gaffney

[11] Patent Number: 5,629,037
[45] Date of Patent: May 13, 1997

[54] PROCESS FOR MAKING CHEESES FROM ENZYME CURDS

[76] Inventor: Bernard J. Gaffney, 9989 Arcola Ct. N., Stillwater, Minn. 55082

[21] Appl. No.: 386,168

[22] Filed: Feb. 9, 1995

[51] Int. Cl.$^6$ .................................................. A23C 19/024
[52] U.S. Cl. ................... 426/36; 426/38; 426/39; 426/42; 426/43; 426/238; 426/582; 426/656
[58] Field of Search ................................ 426/36, 38, 39, 426/42, 43, 582, 238, 656

[56] References Cited

U.S. PATENT DOCUMENTS

| | | | |
|---|---|---|---|
| 3,899,595 | 8/1975 | Stenne | 426/238 |
| 4,675,194 | 6/1987 | Gaffney | 426/582 |
| 4,695,475 | 9/1987 | Zwiercan | 426/582 |
| 4,766,003 | 8/1988 | Skovhauge et al. | 426/582 |
| 5,006,349 | 4/1991 | Dahlstrom | 426/39 |

FOREIGN PATENT DOCUMENTS

| | | | |
|---|---|---|---|
| 1239839 | 10/1986 | Japan | 426/582 |

OTHER PUBLICATIONS

Weber F In:LeFrommage, A. Eck (ed) Lavoisier, p. 22.
Cheese Making Made Easy by Richard Robert Corroll, Storey Communications, Inc. Vermont 05261.
Practical Biotechnology, Denmark copyright, Nova Industries, A.S. 1986.
NCRP Report No. 74, Dec. 30, 1983 (National Council on Radiation Protection and Measurement).
Science Report, University of Wisconsin College of Agriculture Life Sciences Jul. 13, 1992.
J. Food Science 50(4):911–917 (1985) T. Hori.
Cheese: Chemistry, Physics and Microbiology vol. 1, Edited by P.F. Fox, Cork Ireland, Elsevier Applied Science, London, p. 161.
Cheese Making Science and Technology, A. Eck, Editor, Translated form French by C.D. Thomson, University of Wisconsin.
Cheese Making Practice, Second Edition, R. Scott, Ph.D., Elsevier Applied Science publisher, London and New York.
Utah Science vol. 54, Winter 1993 No. 4, pp. 117–119.
El'Piner, Soc. Rev. 3:44–48 (1972)—reference form study by National Council on Radiation Protection and Measurement (see ref. 14) NCRP Report No. 74, Dec. 30, 1983.

*Primary Examiner*—Helen Pratt
*Attorney, Agent, or Firm*—Herman H. Bains

[57] ABSTRACT

A steady flow process converts a fluid proteinaceous mix to a cuttable interstage enzymatic curd and thereafter converts the enzymatic curd to a desired end cheese product. The process includes the step of initially combining an accurately metered and proportioned pumpable stream containing proteins, fats and/or oils and other components, and an accurately metered proportioned pumpable acidified water stream containing an enzyme and other non-enzymatic components. A bacterial agent is included in the enzyme stream. The two streams are admixed by directing the streams through an orifice into an acoustic resonating chamber to produce a turbulent jet stream. The kinetic energy of the turbulent jet stream engages a vibratile element in the acoustic chamber to produce cavitational and high sonic and ultrasonic waves and shearing forces which contribute to immediate homogenization and reaction of the stream components to thereby produce within one minute an enzymatic curd at a predetermined pH above the isoelectric point. The enzymatic curd is thereafter cut and subjected to acidification in a warm water bath to lower the pH of curd from the critical optimum curd forming pH to a pH below the isoelectric point of the contained protein to form a hard cheese product.

29 Claims, 4 Drawing Sheets

1 = 40.0mm diameter
2 = 46.5mm diameter
3 = 53.0mm diameter
4 = 59.5mm diameter
5 = 56.0mm diameter
6 = 72.5mm diameter
7 = 79.0mm diameter
8 = 85.5mm diameter
9 = 92.0mm diameter
10 = 98.5mm diameter

SONOLATED
COWS MILK
(NO FREE OIL)
AVG. 3.20

STANDARD MELT TEST SCORE SHEET (3.25mm between each ring)

*Fig 4*

STANDARD MELT TEST SCORE SHEET (3.25mm between each ring)

PROCESS FOR MAKING CHEESES FROM ENZYME CURDS

FIELD OF THE INVENTION

This invention relates to a steady flow process for substantially and instantaneously forming a cheese curd by conditioning the proteinaceous containing raw materials to a predetermined pH by concurrently introducing an acidified enzyme component to produce in situ enzyme formed cheese curds all in the same increment of time.

BACKGROUND OF THE INVENTION

In conventional cheese making processes, microorganisms and enzymes react with milk or milk products to form a curd. These conventional processes are typically batch processes in which the curd is formed in large vats. In conventional practice, to produce firm or hard cheeses, milk or a milk fraction is acidified to a point above the protein contors isoelectric point by bacteria and rennet (enzyme) or a rennet product, is thereafter added to produce an enzyme curd. All cheeses derive from the initial formation of either an acid curd, or an enzymatic curd. In conventional practice, the transformation of the protein content with fats and other constituents of a milk based feed is a slow process for either type.

U.S. Pat. Nos. 5,006,349 and 4,675,194 each disclose a process for producing a cheese product by instantaneously mixing a protein stream and an acid stream in a high energy resonating chamber. In certain examples in U.S. Pat. Nos. 5,006,349 and 4,675,194, rennet is mixed with the acid stream, but the pH exiting the Sonolator reactor is maintained at or below the isoelectric point of the proteins involved. Since inorganic reactions proceed much faster than organic reactions, the resulting curd is predominantly an acid curd which did not become firm in any of the examples set forth in the two patents. These were directed to markedly decreasing the time of curd formation and stipulated that the immediate curd was acidic at a pH below the isoelectric point, even if enzymes were introduced in the feed streams or stream concomitantly with the acid. This addressed making the softer cheeses and spreads such as Buttermilk, Neufchatel, Cream Cheese, Cottage and Whey cheeses. Having not experimentally made sonolated curd and cheese products above the isoelectric point, no basis was provided for determining what would happen for reactions above the isoelectric point.

However, in conventional cheese making utilizing enzymes it has been found in normal practice to first produce sufficient acid, via a bacterial culture before adding the rennet, to result in the best workable curd. The acid strips some of the bound calcium ions in the milk protein, and provides calcium ions that accelerate the action of the rennet. When to add the rennet has always been a matter of art. However, the pH is always quite some level above the isoelectric point.

One can visualize long chain intertwining protein molecules somewhat analagous to DNA being cleaved by rennet that destroys their solubility. Contrasted to this, an acid precipitated curd with most of calcium stripped would have a different configuration and properties.

As later elaborated, the final curd made by acid precipitation, as disclosed in U.S. Pat. Nos. 5,006,349 and 4,675,194, is bound to have different characteristics than an initial enzyme produced curd even though it is later reduced in pH by acid producing bacteria.

In the conventional cheese making processes, the practice involves much art, i.e. non-scientific efforts, in producing the various hard cheeses. Further, the resulting product is often times non-uniform, especially at a microscopic level. When one tries to make hard cheeses (or cheeses wherein the protein matrix can be worked mechanically or by the heat of transformation) by a one step process of acidification along with an enzyme (rennet) to or below the isoelectric point, one gets a combination of acid coagulum and enzyme coagulum, the extent of each, a function of temperature and time. The reaction rates of acids added with the calcium of a protein is from published data, greater than that of an enzyme. One concludes that the acid curd initially forms or controls and that the enzymatic action follows. Clearly the resulting structure must be different from that involved in first forming an enzymatic curd followed by acid transformation. The non-uniformity is attributable to both the uneven progressive bacterial activity in acidifying the milk protein and the non-uniform progressive action of the enzyme.

On the other hand, the U.S. Pat. Nos. 5,006,349 and 4,675,195 both disclose a method of making an acid curd based cheese. Even though enzyme rennet was used in some of the experimental runs, the dynamics of the chemistry and physics involved were simply not addressed in terms of producing enzyme curd cheeses.

SUMMARY OF THE INVENTION

It is an object of this invention to provide a two step method of producing a hard cheese in which an intermediate enzyme curd is instantaneously formed at a pH above the isoelectric point of the protein feed. Thus there is presented the particulars of making an enzymatic curd at a desired pH above the isoelectric point and thereafter causing the curd to be lowered in pH to the desired level.

In one embodiment of the invention, the protein feed stream which contains a bacterial culture is admixed and instantaneously reacted with an acidified enzyme stream in a Sonolator as a result of sonic and ultrasonic waves and cavitational phenomena producing an enzyme curd at desired pH in a matter of seconds. The curd is placed in a warm bath and the bacterial culture progressively converts lactose to lactic acid lowering the pH of the curd to a selected level.

In another embodiment of the invention, no bacterial culture is included with the protein feed and after formation of the enzyme curd also at desired pH above the isoelectric point of the protein, the enzyme curd is placed in a warm acidified bath wherein the acidified water via diffusion converts the curd to desired cheese pH.

The curd may be further processed into a desirable soft or hard cheese product. Hard cheeses that are produced by this process have a uniform texture and minimize, if not eliminate, the occurrence of oil off and have other advantageous properties. With the aforementioned techniques, all firm to hard cheeses or mimics of them can be manufactured. Examples are Cheddar, Gouda, Swiss, Emmenthaler, Mozarella, and Parmesan. These cover both American, Italian and other country types. Thus the largest segments of the cheese market may be satisfied. Also, by applying the principles set forth cheeses of the processed cheese types can be made without first making a cheese to be reprocessed.

PREFERRED EMBODIMENT OF THE INVENTION

Present processes for making a hard cheese involves two steps including the formation of an enzyme curd above the isoelectric point of a protein feed, and then subsequently lowering the pH. In conventional practice of forming the intermediate enzyme curd, the titratable acidity (related to pH) must be monitored and controlled in order to maintain the titratable acidity at an optimum level above the isoelectric point of the protein involved. At this optimum acidity, the enzyme is conventionally stirred into the batch mixture. The pH is gradually lowered after the formation of the enzyme curd by progressive action of the bacterial culture initially introduced into the feed.

To what pH (above the isoelectric point) the milk (or equivalent) should be brought to before rennet addition, a controlled experiment was made at the University of Nebraska Food Science Center (UNL) as described hereinafter. Later experimental runs were made at UNL utilizing processing through a Sonolator and embodied in the examples given herein.

It was therefore thought instructive to determine the pH throughout the conventional cheese-making process of manufacturing hard cheddar cheese. The study was outlined and carried out at the UNL. During a conventional run, samples of the milk were collected after the normal time for the culture to lower the pH to specified acidity and directly after admixing rennet enzyme.

Recorded data during observation was as follows:

| TIME | pH | DESCRIPTION |
| --- | --- | --- |
| 7:00 AM | 6.64 | Culture Added |
| 7:15 AM | 6.55 | |
| 7:30 AM | 6.57 | |
| 8:00 AM | 6.60 | Rennet Added |
| 8:15 AM | 6.52 | Just starting to set |
| 8:25 AM | 6.50 | Set Firmly |
| 8:30 AM | 6.51 | Cut in Vat |

Successive samples taken from a large vat would be expected to show some deviations because of the something less than uniformity of composition throughout. The recorded data show closely the slow transformation in lowered pH as well as the difficulty in common practice of determining the point to add rennet. A best fit curve of the data would show rennet added at 6.55 and curd set firmly at 6.50.

Of the samples taken directly after rennet addition, one was placed in a water bath at 110° F., the other left at room temperature. The room temperature samples produced a weak soft curd with a pH of 6.43. The sample in water bath resulted in very firm cohesive curd with two inches of whey on top (vs. ½ inch) and a pH of 5.95.

In a conventional process with the enzyme curd forming over a lengthy period of time and changing its gross characteristics from the onset to cut time, one would deduce a non-uniformity in structure with the last bit of formation in the soft gel type characteristic and that of first formed some firmer integrated composition. Presumably different classes of proteins form successive curd components as protein fractions gel and form a curd.

Visualized was that if by Sonolation, the reaction could be reduced to a small fraction of normal time one could obtain a much more uniform structure. Experimentation could then establish desired pH above the isoelectric point for best propertied curd. Temperature of conversion, since it effects reaction rates of the enzyme, was also to be considered. Initially the temperature conventionally employed was taken.

Relatively small changes in pH have profound effects on enzymatic conversion rates. From published information going from pH 6.50 to 6.20 activity increases the activity 100 percent or more than doubles depending on the nature of different enzymes.

It was decided to select a pH close to that at a point that curd is normally cut. It was reasoned that higher pH's such as that of the milk itself must not be desirable otherwise it would be used in commercial practice. This was the starting basis for experimental runs that followed commencing at a pH slightly below that of conventional practice. After curd formation the culture added just before sonolation progressively lowers pH and also creates flavor compounds. Alternatively, flavor but no culture may be added and the curd subjected to lower pH to desired cheese acidity by further processing in an acid bath. Both procedures were demonstrated.

BASIC CONSIDERATIONS

Basic to understanding the distinct differences in cheese making practices is the classification of different curd development. Curds may be classified as precipitated by salt or acid or combinations, and enzyme coagulated curds.

Authoritatively stated, casein fractions precipitated by acid begins at pH 5.3 and is complete at 4.6. Higher acidifications produce precipitation at lower temperatures. It is therefore temperature dependent and influenced by salt level. The curds are open in structure. Gums are often added to assist in proper development as in cream cheese. As pointed out above, the enzyme curd is formed at a pH above the isoelectric point of the proteins in the proteinaceous feed. When the protein in the feed is a milk protein, the isoelectric point is 5.2. However, it should be pointed out that a pH of 5.3 is isoelectric point for the major portion of the protein content of milk protein.

On the other hand, vegetable protein, such as soybean protein has a much wider pH range for coagulating or precipitating a curd. Therefore, a curd derived from the complex protein content of soy milk or soy meal would be expected to precipitate a curd a a pH range extending higher than that of milk protein.

In contrast, coagula produced by enzymes are smoother, shrinkable, and more elastic than acid curds such as those produced in developments recorded in Gaffney et al U.S. Pat. Nos. 4,675,194 and 5,006,349.

An enzyme such as Rennet acts on the substrate casein in the presence of calcium ions, and an insoluable coagulum forms in which fat or oil components along with water, salts etc. are bound. Their nature is such that various mechanical and heat treatments can transform them to varied products with distinctly different properties.

Bacteria, primarily Lactococcus and like *bacillus* species are the organisms that produce lactic acid in cheese making operations. These are mixed populations with competitive reaction phenomena related to surface chemistry and temperature. The relationships of process variables of temperature and pH are complex and not independent of mixing mode during reaction. For example, there is evidence that high shear conditions can destroy some bacteria. However, with the method herein described wherein acid is added to optimum level for curd development by an enzyme, all that is required is that residual bacteria thereafter develop lactic acid to lower pH in cheese as might be required.

Further, the alternative method that was conceived and demonstrated as hereafter described subjecting the curd cubes to an acid or acid/salt bath accomplishes not only achieving a desired end product pH but substantially fixes the value for the stored product. In conventional practice, the residual bacterial content progressively on storage lowers pH slowly over time. Enzymes on cheese storage contribute to cheese properties by further actions producing flavorable compounds in a complex manner.

A rennet enzyme curd exhibits syneresis which permits curd consolidation and cheese properties not developable for acid curds. One reference, namely Weber F In: LeFrommage, A Eck (ed), Lavoisier, Paris, p.22, postulated that an acid curd might with rennet addition gradually change to a rennet-induced gel which would be of importance in the production of fresh cheese types. This possibly offers secondary or post enzymatic curd transformation. After forming an acid matrix any transformation of the curd would be lengthy in terms of time and the structure would be different than an enzymatic formed curd cheese.

Procedures for making goats milk cottage cheese illustrates this phenomena in Cheesemaking Made Easy by Richard Robert Carroll by Storey Communications, Inc. Pownal, Vt. 05261. It is stated that a small amount of rennet must be added to skim goat's milk because the solids content of goat's milk is not sufficient to allow starter bacteria to adequately coagulate the acid curds after 18 hours of ripening (acid development) by a mesophilic cheese starter culture. From experience utilizing whole goats milk, it was found that in normal practice a small amount of rennet aids in getting the very fine curd particles to stick together to coalesce into larger filterable ones. Thus enzymes can have a secondary effect on acid curds.

In contrast, an enzymatic formed curd as acidity later develops (from bacterial action, or from acid diffusion into a curd subjected to acidic water) the syneresis rate is increased which enhances, for example, making hard cheeses such as cheddar versus cottage cheese.

In one experiment at UNL, renneting of goat's cheese was accomplished in making a Feta cheese in a few minutes versus conventional 2 hours illustrating again the great reaction rate increased by sonolation.

Enzyme curds are formed above the isoelectric point. It seemed clear that the pH of the curd or resultant cheese would only get to the desired point some hours after curd formation.

Formation and/or treatment of the curd at some elevated temperature was shown to be required to obtain a desirable cohesive curd. The data from the experimental runs also invoked a consideration of the relative reaction rates of rennin respecting pH and temperature. Novo has published a Hand Book of Practical Biotechnology, Denmark Copyright, Novo Industries, A/S 1986, containing information respecting their Rennilase and other like products. A plot of percentage relative activity versus temperature shows activity increasing with temperature from 32° C. to 45° C. Another plot of relative activity shows increased activity as pH decreased, being roughly twice as active at pH 6.2 than at 6.5. Also, there is a marked increase with small amounts of calcium chloride or calcium concentration. Selecting conditions are thus dependent on several factors.

It is also known that many proteins denature above 45° C. (115° F.). Thus to decrease time for enzymatic curd formation seems limited to not exceeding 115° F. Further, the activity of Rennet or substitute enzymes generally decrease above this temperature.

NCRP Report No. 74. Dec. 30, 1983 (National Council on Radiation Protection and Measurement) references articles describing the effects of acoustic cavitation such as the acoustic cavitation produced in a Sonolator. A sonolator is the preferred apparatus in carrying the present process and is described hereinbelow. Besides exerting mechanical stresses, this phenomenon can also act by generating free radicals, and thus promoting chemical changes. Such effect might be one cause of the unusual very short time for Rennet to react giving curd formation.

The same reference states that in oscillating bubbles (present in cavitational phenomena) and the presence of biological cells or other particles in the vicinity there are attractive forces which lead to the particles gathering or migrating near the pulsating bubbles where high shear stresses can alter them. One can logically deduce increased physical and chemical changes in such an environment as exists in a Sonolator.

The type of equipment or apparatus used in the first step of this inventive process producing an enzymatic curd is an homogenizing type apparatus, preferably a Sonic Sonolator although possibly a piston/orifice type homogenizer might be used if it exhibits similar phenomena. A Sonolator was found to achieve nearly instantaneous conversion of the feed streams into the enzyme curd. It is fairly well established that cavitational and shear phenomena occur in the Sonolator during its operation and promotes greatly increased transport of reactants and diffusion rates in the multi-phase reaction regime thus producing instantaneous and uniform reactions of the feed materials to form the enzymatic curd. Cavitation may occur in the piston/orifice homogenizer if sufficient fluid pressure is employed. Cavitation is a phenomena that can be produced directly by acoustic waves propagated in liquid medium, or indirectly by such waves energizing a vibratile element, as in a jet/blade ultrasonic whistle such as disclosed in the Sonolator. Cavitation results as the acoustic pressure in the radiated wave exceeds the hydrostatic pressure in the medium, for example, water in the protein/fat/water complex.

The violent phenomena of transient type results from cavities being formed either from vapors or the liquid, or from dissolved gases in the medium. Vaprous cavitation requires higher intensities than the latter. A single cycle of sound wave produces the effect, rather than accumulative effect such as bubble growth via a slow diffusion process. When cavitation happens, all of the kinetic energy of collapse of the cavity is dissipated in a minute amount of mass resulting in very high pressures and temperatures which in turn are dissipated to the medium at a similar micro second time sequence. The effective presence of cavitation in a Sonolator is attested by pitting of the vibratory blade and possibly in a piston/orifice homogenizer by pitting of the surface impinged by the extremely high velocity jet.

After the first step resulting in curd formation, when to cut the curd as a second step has been very difficult to determine. Recent advances are recorded in the publication Science Report in the publication University of Wisconsin College of Agriculture Life Sciences Jul. 13, 1992. In this article, an ultrasonic sensor is described as a non-destructive method to determine when coagulation starts and to determine the curd characteristics relative to curd density during the clotting time. This method involves continuous monitoring and multi-sampling monitoring throughout the vat in which the curd is being tested. If one cuts cheese too soon, curd particles and fat are lost in the whey causing loss of yield. If one cuts the curd too late, the moisture is trapped inside resulting in high moisture cheese. It was stated that laboratory predictions come very close to manual cut time predictions wherein curd is disturbed by lifting the curd and observing.

In an article appearing J. Food Sci. 50(4): 911–917 (1985) T. Hori, disclosed the use a hot wire measurement device relating the increase in wire temperature to state of curd time or coagulum formed by rennet action. Time to clot is the time interval from adding rennet to initial formation of gel or curd. Clotting time is the time interval from initial formation of curd to when to Sonolator process for forming a curd, time to clot is the two or three seconds elapsing for passage of the reactant feed streams through the Sonolator. Clotting time, depending on concentration of protein in a major feed stream, is of the order of 30 to 60 seconds in the present process compared to 30 minutes in conventional processing. It was found in sonolation runs that the greater the protein concentration, the shorter the time.

There have been developments to measure rate and extent of coagulation of milk. For skimmed milk, by varying the concentration of rennet and pH of the milk from 5.53 to 6.59 and by varying the temperature from 30° to 40° C., Hori of the J. Food Science article was able to derive an equation relating all of these factors (concentration, pH, temperature) to clotting time. However, this was all related to fairly quiescent conditions in a vessel and constituted a non-turbulent medium. The initial rates would be expected to be much greater in a Sonolator exhibiting very high turbulence. Hori did show that flavor, hardness, mouth feel and springiness were all effected over a range of cutting time for curds up to one hour, but pH was found to be the fundamental factor that must be strictly controlled in automation of curd making.

It was postulated that if one has near absolute control of a predetermined fixed pH, and if one nearly instantaneously forms a curd at that pH, then the formed curd should be near ideal. In contrast, to conventional practice, as in Hori's small scale experiments, gives some kind of integrated clot or coagulant characteristics over a somewhat lengthy time factor, and with varied results. In contrast, curd forming through Sonolation frees one essentially from time of reaction. For a given protein/oil/water mix, if one fixes the ratio of an acidified rennet solution, the temperature of the combined mix, and the set conditions of pressure and acoustic peaking in the Sonolator, pH is nearly absolutely controlled above the isoelectric point. These requirements can be and are met in practicing the present process.

Some authorities on cheese-making claim homogenization of milk has certain effects on the products. In the publication Cheese: Chemistry, Physics and Microbiology, Vol. 1, Edited by P. F. Fox, Cork, Ireland, Elsevier Applied Science, London. p. 161, it is stated that some findings indicate that homogenization of milk significantly decreases syneresis rate. This is related to the incorporation of micellar casein in the surface coat of the fat gobules. This causes the fat gobules to become part of the paracasein network, which in turn will hinder shrinkage of the network. However, there are conflicting conclusions by others who have reportedly made analagous studies. Moreover, this finding did not appear clearly applicable from analysis of the cheese runs involving the present process where both milk and its equivalent were homogenized by Sonolation while reacting with an enzyme.

The publication Cheese Making Science and Technology, A. Eck, Editor translated from French by C. D. Thomson, University of Wisconsin, contained studies that use homogenization of milk per se using a device "having a clack value with a cutting edge at pressure of 3,000 to 9,000 psi." In renneting, the time for coagulation was cut 55 to 65% of the control value, and obtained an increase in the firming rate of the gel and its maximum firmness. This coagulation or time to clot is still based on say normal 15 to 30 minutes to commence initial coagulation which differs by an order of thousandths for onset when Sonolation is used directly after rennet addition to milk or its equivalent.

Literature referencing present commercial practices indicates homogenization of milk may result in reduced loss of fat into the whey, improved cheese texture, and increased yield. No one however appears to have used homogenization of dual reactant streams as is done in the developmental work leading to the instant process for producing enzyme curds.

Enzymatic conversion of protein is important in major cheese making processes. There are different kinds of enzymes, some that hydrolize starch, or fats or oils, some can rearrange molecules, and some produce flavor compounds, etc. In cheddar and similar cheese-making, the predominant setting enzyme used is rennet, natural or synthetic. This proteolytic enzyme selectively attacks nitrogen-carrying compounds, especially proteins. These are the protein splitting enzymes. In cheese-making, rennet acts by breaking peptide bonds and removing a glycopeptide from casein to yield a relatively insoluble calcium paracaseinate, which as a precipitate forms a cheese curd.

In cheese-making processes which utilize enzymes, it has in normal practice been found important to first produce sufficient acid, via bacterial culture before adding the rennet, to form the best workable curd. The acid strips some of the bound calcium ions in the milk protein, and provides calcium ions that accelerate the action of rennet. When to add the rennet has always been a matter of art in order to obtain the desired curd characteristics. The pH is always some level above the isoelectric point of the protein involved.

In current cheese-making, one adds a starter culture to the milk at some temperature and waits until a sample taken from a vat of a few thousand gallons capacity has a certain titratable acidity. Then the rennet enzyme is added and admixed. It is known that stirring of the coagulum that is too vigorous or too prolonged, causes the curds to whey off quickly losing fat which rises to the top of the milk. When the curd gets to what is judged to be the proper stage or have the right property, it is cut into small pieces and thereafter variously treated to cause liquid whey removal via what is termed syneresis.

In the publication Cheese making Practice, Second Edition R. Scott, Ph.D., Elsevier Applied Science, Publishers, London and New York, it is stated that even after the initial curd formation other reactions continue with proteolysis of the alpha and beta caseins as some 6% of the rennet added to the milk remains in the curd where it is still active. Also the acid bacteria prior added continues to produce acid by reaction with residual lactose, decreasing pH which increases enzyme activity.

During the conventional time of processing to a critical pH before an enzyme addition, sufficient acidity is built up to strip calcium ions from the protein sufficient to accelerate enzymatic reaction which is influenced by pH and calcium ion concentration. Calcium ions have also been shown to accelerate the aggregation of protein micelles, prior to their forming amorphous masses or coagulums.

Further, other than producing soft cheeses, other cheeses require extensive post treatment. Mechanical and/or heat treatments have proven necessary both to relax a curd and orient its intertwining structure to yield types like Mozzarella-stretchable, as one characteristic, or hard cheeses such as cheddar which resists stretching and cuts into fairly solid blocks or slices.

In the publication Utah Science Vol. 54, Winter 1993 Number 4, p. 117–119, the director of Dairy Research and Technology, pointed out that in efforts to create low-fat cheese that a better understanding of milk coagulation would help. "There are still a lot of unanswered questions about the structure of protein in milk and of the mechanisms involved in coagulation." As pointed out herein, Sonocated reactive masses have the effect of freezing product composition in very short reaction time and thus improved control and duplication of results.

The normal reaction rates of enzymes are exceedingly slow compared to acidified reactions where one can titrate to specified pH at instant end points. It was thus surprising to see an enzymatic curd form near instantly after Sonication of a concentrated mixture of protein powder, fat or oil, and water, and more surprising after Sonication of milk which is approximately some 90% water.

There have been some studies on the effect of ultrasound on enzymes and on enzyme-catalyzed reactions in Vitro. In Edmonds P. D. Hew Publication (FDA) 73-8008 pp.5–11, it was found that interactions between macromolecules such as proteins appear to be affected by ultrasound. El'Piner observed that ultrasound can cause disruptions in the spatial relationships of macromolecules in cell membranes and postulated that this would cause exposure of new active centers and functional groups. Such effect would promote chemical and/or biological reactions. El'Piner, Sov. Rev. 3:44–48 (1972). In a study by the National Council on Radiation Protection and Measurement, it was reported that cavitation can effect biosystems by virtue of exerting mechanical stresses and can also act by generating free radicals, and thus promoting chemical changes. However, "there appears to be no studies on the effect of ultrasound on the rate of enzymatic reactions, and in particular those related to curd and cheese formation."

Another feature of the present invention is the inclusion of the fibers in the protein stream. Although yogurt (not classified as a cheese) and some soft spreadable processed cheeses may contain large fibers such as fruit fibers or vegetable fibers, most of the present cheeses including firm and/or hard types do not contain fibers. It is submitted that the inclusion of fibers in the cheese provide a healthful and nutritional additive. It was found that fibers could be added via the process described herein.

The fibers to be used must be capable of being included in the cheese product without impairing the process and must not substantially effect the mouth feel of consumers. Therefore, crystallite starch fibers are suitable since such fibers are only a few microns in dimension and do not have a negative effect on the mouth feel in the manner of cellulosic fibers that are many times the size of the crystallite starch fibers. Sonolation is also very effective in providing the high shear needed for incorporation of fibers into the cheese particularly for starch crystallites.

Another consideration in selecting fibers as an additive to the cheese is the water holding capacity of the fibers. The water holding capacity of fibers effects the viscosity increasing it to varied degree depending on the fiber source, and effecting the energy input needed to disperse and hydrate the fibers. For making cheese from concentrated protein feeds, the water holding capacity of the fibers limits the maximum amount that can be incorporated and processed through a Sonolator. However, whatever is pumpable can be processed. Thus, a starch product sold under the trademark Novelose has a 200% water holding capacity versus 800% for an oat fiber or over 500% for cellulose and offers an advantage as to incorporating the most fibers or as a substitute for fat and in satisfying the daily fiber requirement. The NOVELOSE starch product is a starch crystallite produced by National Starch and Chemical Company. Typically fibers are comprised of carbohydrates, simple sugars, proteins, fat, ash and moisture. NOVELOSE contains a total dietary fiber content of 30–35% analyzed as insoluble fiber. Fiber includes total dietary fibers and soluble fibers. Different cellulosic fibers and starch crystallite fibers were incorporated. Some of the fibers screened for incorporation into the cheese products include stabilized rice bran, oat fibers, soy fibers and sugar beet fibers. These fibers are comprised of hemicellulose, pectin, cellulose and lignin and some sugars as well as protein and other minor components. Starch crystallites may also be added under the definition of fiber.

The processing of milk per se to cheese while incorporating fiber presents the problem of yield of fiber in the cheese product. Some portion of the fiber (the degree depending on type and properties), if added to present commercial processes, would go out or would be lost with the whey. On the other hand, incorporation of fibers in a concentrated mix of protein and fat or oil and/or fat substitutes whereby essentially no whey results presents real opportunity as was demonstrated. The ease in making processed type cheese products, or in spreads utilizing Sonolation processing techniques was recognized. Pilot runs transforming a conventional no-fat process cheese formula was made eliminating the incorporation of skim cheese and substituting by Sonolation enzymatic conversion of protein powder (75% protein) and requiste fats or oils.

THE PROCESS AND APPARATUS

Figures 1, 1A, 1B:
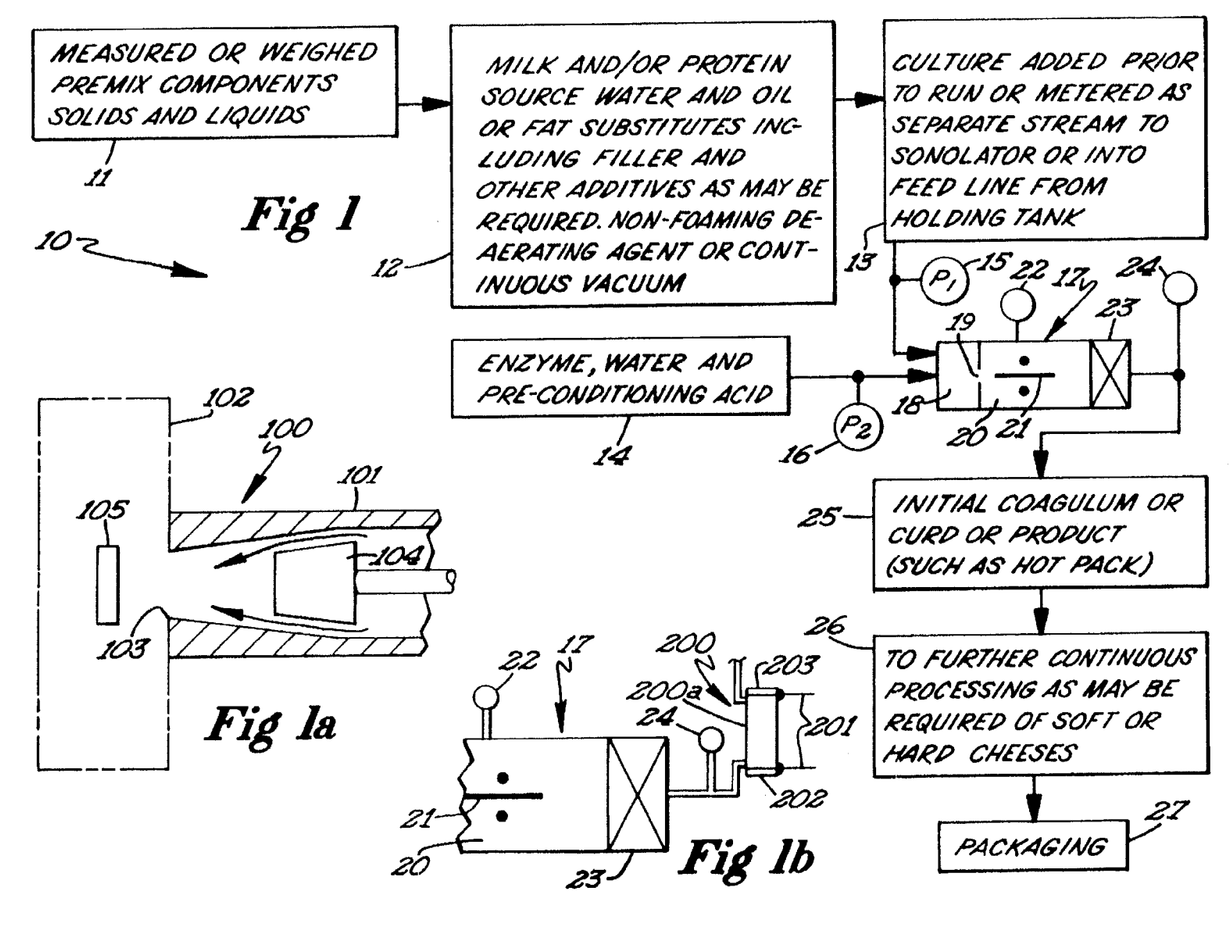
FIG. 1 is a flow diagram schematically illustrating the steps of the novel process.
FIG. 1a is a fragmentary diagrammatic view of a piston/orifice apparatus which may be used as an alternative to the sonolator in the novel process.
FIG. 1b is a fragmentary diagrammatic view illustrating a different mode of heating the curd in the novel process.

Referring now to FIG. 1 of the drawings, it will be seen that the block diagram presented therein schematically illustrates the various steps and components used in carrying out the novel process. In the diagram, designated generally by the reference numeral 10, the various components are measured and weighed as indicated at 11 and include solids and liquids that are placed in a holding tank 12. These materials include various proteinacious materials, fats and/or oils, water, flavoring, salt coloring and other components. The protein material may include a milk protein powder, whole milk, (cow, goat or other animal derived) ultra filtered retentates, soy milk, soy flour, whey protein concentrates and most other protein type components. The oils and fats may include animal and vegetable oils and fats such as sun flower oil, butter fat, and similar components.

The components placed in the holding tank constitute the protein feed and will include additives such as fiber, color, flavor, etc. The protein feed may also be provided with a non-foaming de-aereating agent or the protein feed may be subjected to a continuous vacuum.

In one embodiment of the novel process, a bacterial culture will be provided and may be contained within a holding tank 13 or the culture may simply be added to the protein feed prior to the introduction of the stream into the Sonolator. The bacterial culture may also be fed as a separate stream directly into the Sonolator along with the protein feed and the enzyme water and preconditioning acid stream.

Holding tank 14 contains enzyme and water with addition of a preconditioning acid. In the preferred embodiment for making cheddar, the enzyme is either natural rennet or a synthetic rennet such as Hanson's Rennilase™. Other enzymes for different cheeses can be used as is well known in the art. The enzyme feed containing a preconditioning acid such as lactic acid is fed as a separate stream to the Sonolator 17. Suitable positive displacement pumps 15 and 16 provide identical pressure to the feed streams as they are introduced into the Sonolator 17. These high pressure streams are introduced into a mixing chamber 18 of the Sonolator 17 where the streams will be immediately and thoroughly admixed as they flow through an orifice 19. The Sonolator 17 is provided with a vibratile element 21 which is adjustable therein towards and away from the orifice 19. The distance or spacing between the leading edge of the vibratile element 21 and the orifice 19 effect the sonic intensity occurring in the Sonolator. A sonic intensity meter 22 is mounted on the Sonolator and constantly monitors the sonic or acoustical intensity. A back pressure control valve 23 is provided at the down stream end of the Sonolator and adjustment thereof controls the back pressure necessary to peak the acoustic energy.

By adjusting the vibratile element 21 with respect to the orifice opening 19 and thereafter adjusting the back pressure control valve 23, one may obtain peak sonic intensity in the Sonolator which enhances the curd forming process. The admixed streams form a jet passing through the orifice 19 and quickly sheds the vortices producing the so called jet edge tone. The vibratile element 21 splits the jet into two sheets in high shear one on each side of the blade. These shear layers consist of eddies and vortices and this kinetic energy is immediately transfered to the vibratile element to cause the latter to vibrate in high sonic and ultrasonic frequencies. Thus the kinetic energy of the combined streams produce high sonic and ultrasonic wave energy and cavitational phenomenon resulting in instantaneous reaction with the production an enzyme curd.

The pH of the admixed materials is maintained at a level sufficiently above the isoelectric point of the protein material to form an enzyme curd. The pH meter 24 constantly monitors the pH of the mixed material and the extruded initial curd is delivered to a downstream station. The enzyme curd may be placed in a receiving vessel at the station 25 and may thereafter be cut in the traditional manner. It is pointed out that after the curd is formed above the isoelectric point of the protein, the bacterial culture converts the lactose into lactic acid and continuously and progressively lowers the pH. In this regard, the curd, for example, may be placed in a warm water bath conditioned to 120° F. and allowed to remain there for a predetermined time approximately an hour. After the pH is lowered, the curd may be removed and directed to a further processing station 26 for additional processing. For example, the curd may be salted and pressed as required. Finally, the formed cheese, may be then be delivered to a packaging station 27 where the cheese is packaged.

It is also been found that a modified form of the process above described will achieve equally desirous results. In this alternate form of the process, the bacterial culture is omitted from the protein feed stream and the enzyme curd is formed in exactly the same manner as previous described. After the curd is formed, the curd may be cut into cubes and placed into a 120° F. water that has been acidified to a low pH. The acid may be lactic acid and will lower the pH by diffusion into the curd to develop the desired acidity or pH cheese product.

Heating of the curd during or after formation by means other than conventional heating of the water medium in which they form or in which they have been later subjected may be accomplished in other ways. The present systems heat by conduction with a thermal gradient from the water in which the curds are suspended. This is an unsteady state of heating with temperature gradients from outer to inner curd formation gives rise to variations throughout in physical and other properties.

One technique that has been commercialized is Ohmic heating that heats food by passing electricity through it with reportedly 90% energy conversion. The expression Ohmic heating is a proprietary term for a process developed by the Electricity Council Research Center in Capenhurst, England in which product is heated by internal resistance as an electrical current is passed through it. The commercial Ohmic heating system consists of a vertical or near-vertical column formed by four or more electrode housings mounted one above the other and separated by spacer sections.

Referring now to FIG. 1b, it will be seen that an Ohmic heating system 200 is illustrated as receiving the enzyme curd from the Sonolator 17. The heating system 200 comprises a vertical column 200a through which the curd is pumped. Suitable electrical electrodes 202 and 203 are attached to the end of the vertical column 200a. Electrical conductors 201 are electrically connected to the electrodes 202 and 203 and are connected to a source electrical current for providing electrical energy to the curd.

As product is pumped upward through the vertical column, its temperature can increase as much as 2° F. per second. The product is heated by the direct passage of the current through the continuous flow of the curd through the colum 200a. Another feature of the Ohmic system is its ability to handle high solid loadings. Tests have demonstrated that it can run products containing up to 80% solids. The curd extruded from the acoustic chamber is directed upwardly through an Ohmic system where the curd is heated to the desired level with uniform heating occurring throughout. All portions of the curd in the column are heated uniformly at a uniform rate and nothing gets over cooked. For low acid products, the system can produce a final product temperature as high as 284° F.

Commercial Ohmic systems include 75 killowatt (KW), 2 inch diameter, and 300 killowatt (KW), 4 inch diameter models, rated at 1650 and 6600 lbs of product per hour respectively. The column 200a is formed of stainless steel having a suitable electric insulating plastic liner formed of polyvinyliene fluoride, polyether ether ketone, or glass.

The electric current not only uniformly heats the curd flowing through the vertical column, but will effectively sterilize the curd by killing any micro organisms therein if heated sufficiently. This permits aseptic packaging of product subjected to Ohmic heating. Ohmic heating is therefore characterized by approximately 90% energy conversion and can effectively and uniformily heat product containing up to 80% solids. Thus curd or cheese bits may be heated by the Ohmic heating system depending on the pumpability of the product.

Another heating technique that is available is radio frequency heating which is similar to microwave heating except radio frequency heating uses wave lengths measured in meters rather than millimeters. In this style of heating, the product to be heated is subjected to an oscillating current which forces water molecules in the food product to reverse directions at the same frequency as the radio frequency waves thereby causing molecular friction that generates heat. There are also other heating systems that may be used to heat the extruded curd as the curd leaves the acoustic chamber.

Figure 2:
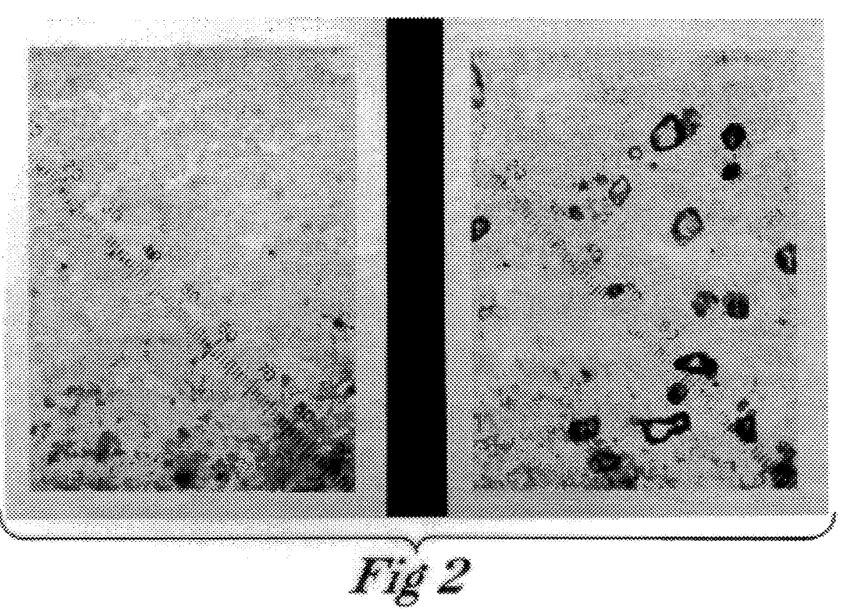
FIG. 2 are photomicrographs of a cheese products produced by the novel process in the left photograph and a corresponding commercial cheese product in the right photograph; and, FIG. 3 are comparative photographs illustrating the dried cheese product produced by the novel process on the left, and illustrating a dried commercial cheese product on the right.

In order to appreciate the differences in a product produced by the present process and a product produced by the conventional method, reference is now made to FIGS. 2–5. In FIG. 2, photomicrographs of a cheddar cheese composition produced by the process herein described are depicted in the photograph on the left and that of a national brand produced by the conventional method depicted on the right. FIG. 2 illustrates microscopic structure of the two products. Each division represents 4.8 microns. Whereas those on the left produced by the sonolation process herein described are predominantly smaller than 4.8 microns, many 1 micron or less, those of the national brand have a larger percentage over 4.8 microns and many several times that size. It will therefore be seen that the product produced by the present process is substantially more uniform than that of the national brand, and the national brand thus exhibits something less than uniformity and this non-uniformity contributes to the negative factor seen and described in reference to FIG. 3.

Figure 3:
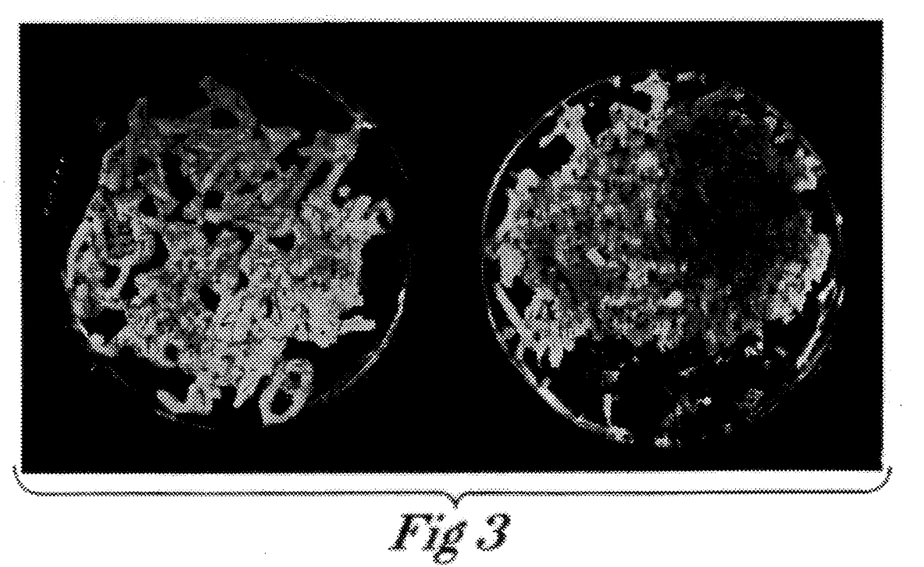

Referring now to FIG. 3, the photograph on the left depicts a cheddar composition cheese product produced by the sonolation process herein described, and the photograph on the right depicts a major national brand of mild cheddar produced by the conventional method. Again, the purpose of the photographs is to show a comparison of the two products when subjected to a standard dryness test. Both cheese samples were treated by the exact same temperature/time conditions in oven to dryness in a standard test to determine percent solids. The sonolated produced sample exhibited uniform cohesiveness, no discoloration, desirable "stringing" characteristics of holding together, and negligible oil separation. The major national brand depicted in the photograph on the right showed distinct discoloration, a break into small particles, and extensive oil/fat separation.

Figure 4:
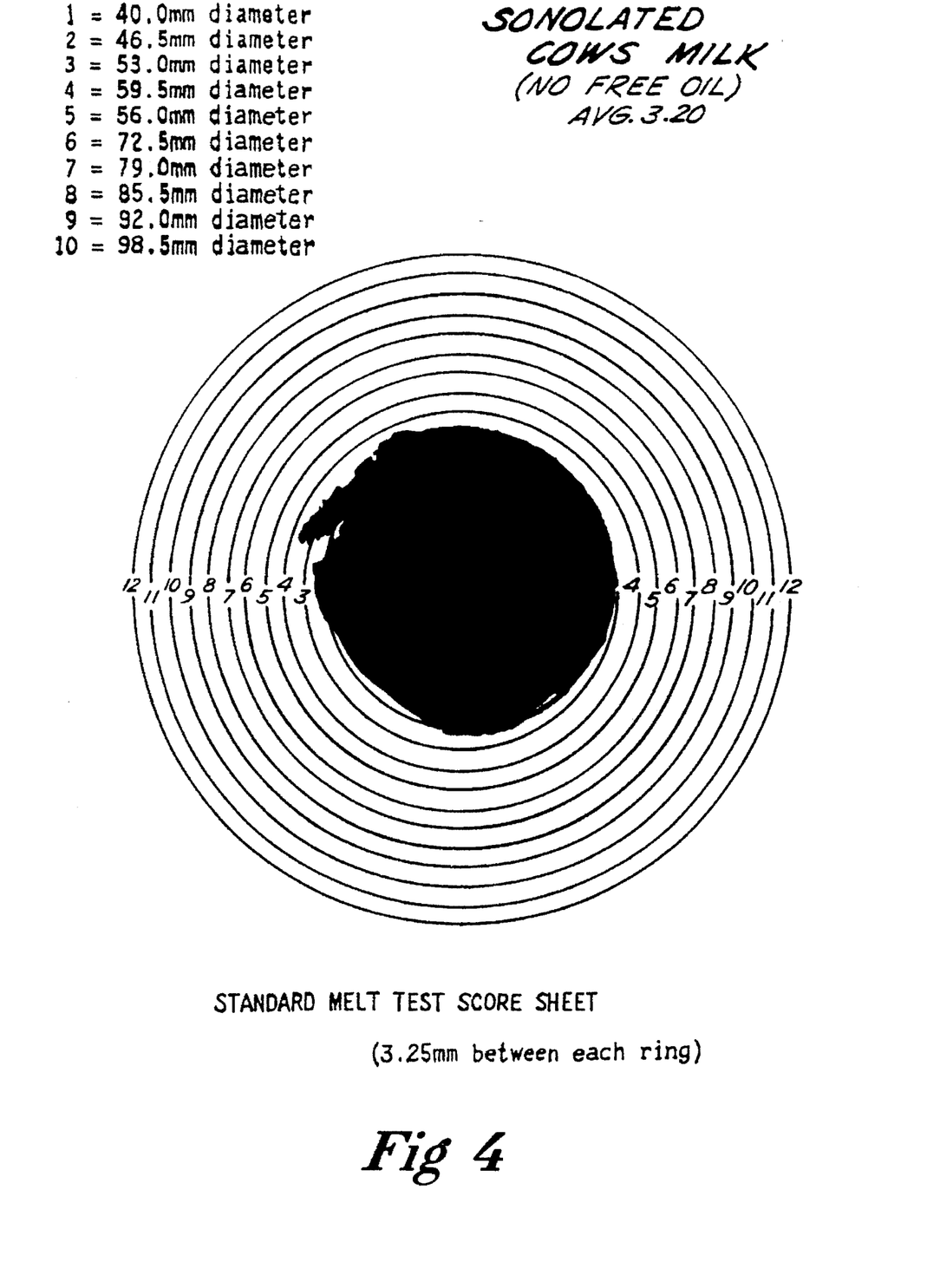
FIG. 4 is a reproduction of a photograph of standard melt of a sonolated cheese product produced by the instant process.
Figure 5:
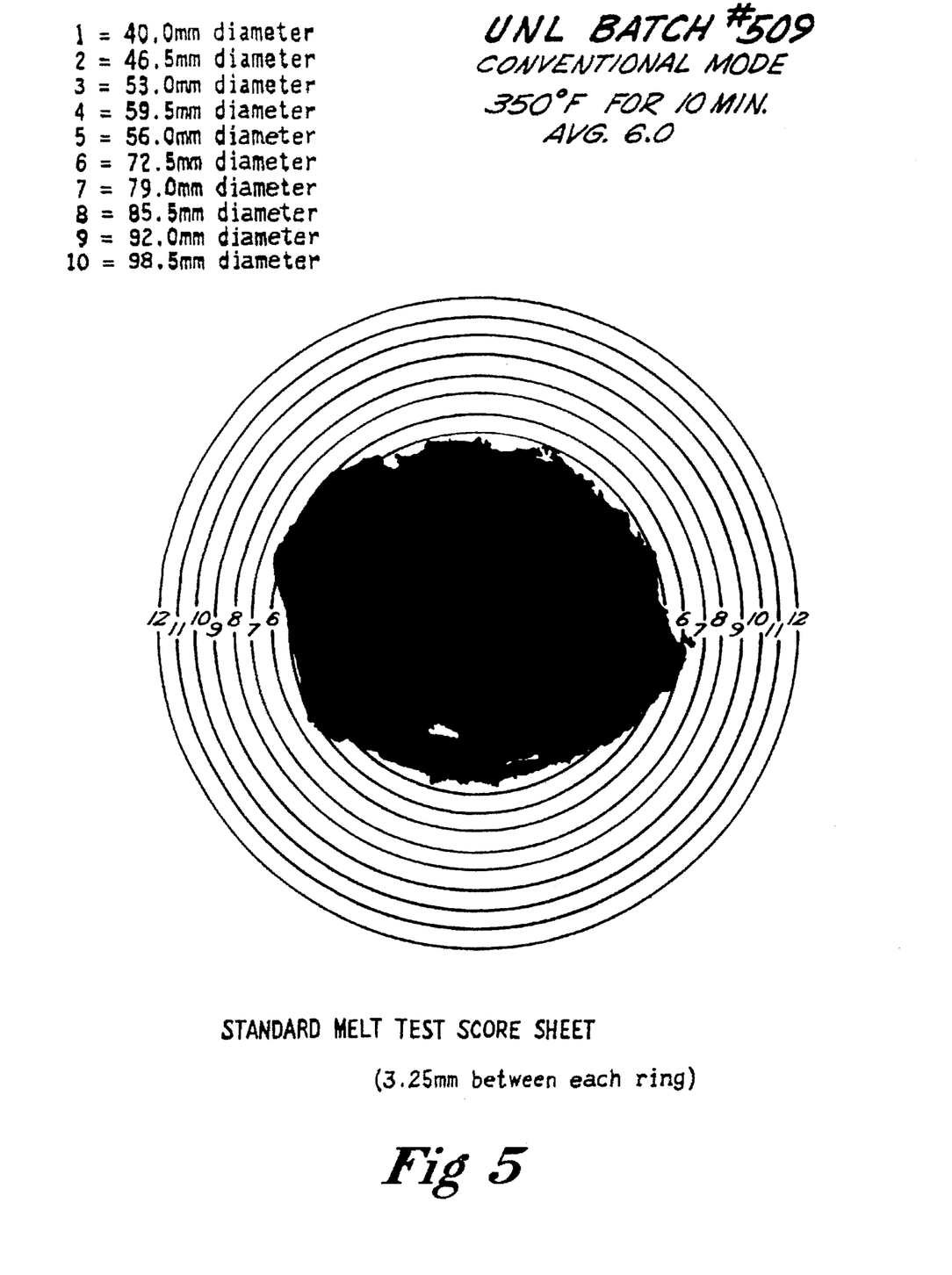
FIG. 5 is a reproduction of a photograph of a standard melt test of a standard brand commercial cheese product of similar composition to that of FIG. 4.

Referring now to FIGS. 4 and 5, a standard melt test comparison was made between the cheese product produced by the present sonolated process and a national brand produced by the conventional method. FIG. 4 depicts the melt test results of a cheese product produced by the sonolated process, and FIG. 5. depicts the melt test results of a standard brand product produced by the conventional process. It will be noted from an examination of FIGS. 4 and 5 that each respective sample is positioned upon a measuring device defined by a plurality of concentric rings, each ring having a diameter designation to indicate the amount of spread as the cheese sample is melted. The greater the score the poorer the melt characteristics. The sample depicted in FIG. 4 was produced from sonolated cows milk and had the same ratio of protein to fat as in cheddar cheese. The sample depicted in FIG. 5 is a standard brand cheddar cheese.

The melting profile was approximately the same but there was less spread area for the sonolated process, and there was no oil or fat separation in the sonolated cheese while the conventional product showed substantial product fat or oil separation. It will be noted in FIG. 4 that the average melt of the sample was 3.20 millimeters while the average melt of the sample depicted in FIG. 5 was 6.0 millimeters. It will further be noted that in FIG. 4, that the sample melted uniformly while the sample depicted in FIG. 5 had a non-uniform expansion. Finally, it will be noted that the sample made by the present process depicted in FIG. 4 had no free oil while there was substantial "oil off" in the sample depicted in FIG. 5. Thus the sonolated product does not separate out into fats and solid non-fat portions, and it simply melts as one entire homogenous mass.

In summary, a review of FIGS. 2–5 clearly shows the differences between conventionally produced commercial cheese products and the sonolated product with respect to the products when dried, melted, and when viewed microscopically. The commercial cheese products depicted FIGS. 2, 3 and 5 are representative of certain commercial cheeses. The photo-micrographs show the uniformity of a product produced by Applicant's process when compared to a standard brand cheese which illustrates non-uniformity. When dried, a commercially produced cheese product becomes discolored with breakage and extensive oil/fats separation while the sonolated cheese product shows no discoloration, no separation in small particles and no oil/fat separation. Finally, conventionally produced cheeses have poor melt characteristics with substantial "oil off" while the sonolated product has desirable melt characteristics with little or no "oil off". The extruded cheese produce made by the present process may be dried to form cheese chips.

Referring now to FIG. 1a, a piston/orifice type homogenizer 100 may be used in lieu of the Sonolator 17. The piston/orifice homogenizer 100 includes a feed line 101 which communicates with a homogenizing chamber 102 via a tapered orifice 103. A tapered piston 104 is moveable in the orifice to vary the orifice size as the high pressure feed stream is fed through the passage 101. The flow of material will occur around the piston. A target element 105 is positioned in confronting relation with respect to the orifice 103. Cavitation reportedly occurs as the high pressure liquid impinges against the target 105.

The following are representative examples of the experimental runs of the present process:

EXAMPLE 1

In a pilot run, a Sonolator was used to make a basic cheese with a protein/fat/water composition equivalent to a cheddar cheese. A milk protein powder was used for the protein source, Sunflower oil for the fat, organically synthesized lactic acid, rennilase as a rennet enzyme.

The quantities of ingredients for two separate mixes were as follows:

| PROTEIN FEED | | ENZYME FEED | |
| --- | --- | --- | --- |
| Erie 76.5% Powder | 2.5 lbs | Lactic acid | 25 Gms |
| Sunflower oil | 2.5 lbs | Rennilase | 100 CC(5% Sol) |
| Annatto color | | CaCl₂ | |
| Flavor | | Water | 1.5 lbs |
| Salt | | Total | 1.75 lbs |
| Water | 9.5 lbs | | |
| Culture | 0.5 lbs | | |
| Total | 15.0 lbs | | |

The protein/oil mix feed stream was prepared by mixing the powder and water in a Groen Steam Kettle holding at 120° F. for 30 minutes. To prevent incorporating air, the sunflower oil was then added with gentle agitation. A controlled quantity of SWS-211 antifoam was also added to prevent air entrapment. The acid/rennet feed stream was prepared with water at tap temperature. The two streams were fed separately by positive displacement triplex pumps with relative rates to give a curd pH of 6.1. Protein stream feed rate was 0.781 GPM, and the acid stream rate of 0.045 GPM (gallons per minute) giving a Sonolator pressure of 500 psi (pounds per square inch). A smooth creamy curd formed as the output stream was fed to a receiving vessel. When completed, the one gallon vessel was upended and the curd was like jello when removed from a mold. The curd was cut into approximately one inch cubes, and then put into water preconditioned to 120° F. and contained there for one hour. Curd sank in the water and was observed to be firm and rubbery. Curd was removed and pressed at 45 psi for 3 hours, and then removed to refrigeration. Curd was very firm and homogeneous.

The cheese was analyzed at the University of Nebraska Food Science Center and evaluated as having a texture similar to Swiss or Monterey Jack. It sliced very cleanly and easily and was very homogeneous. It was reported to look like real cheese made from milk and it had a pleasant taste. An instron-hardness test was run on the product and on a cheddar cheese for comparison. Cheddar cheese required a 0.25 kg of force to shear the sample; this particular run of cheese required a greater force of 0.31 kg. This showed that hard cheeses could be thus manufactured at least as hard as Cheddar, salting the curd would have produced even greater hardness and flavor as desired could be added.

EXAMPLE 2

A pilot run was made making up two mixes exactly as in Example 1 but no culture was added. The same quality curd was obtained. This was then cut into cubes and put into 120° F. water that had been acidified to a low pH. The pressed curd seemed analagous to that of Example 1. The pH of the curd before placing in the acid bath was 6.1 measured by inserting the pH probe into the curd before cutting and after processing to desired pH. The cheese taken out of refrigeration after a few days was tested for pH level and found to be a pH of 5.40. Thus a cheese was produced with invariant pH on storage.

EXAMPLE 3

This run was made to demonstrate one could obtain a hard cheese from essentially a reconstituted milk concentrate made from protein powder and milk cream. The quantities of ingredients for two separate mixes were as follows:

| PROTEIN FEED | | | |
|---|---|---|---|
| Milkpro 75 (Commercial Protein Corp.) | 2.00 lbs | Lactic Acid Rennet (Single Strength Calf's) | 50 Gms 10 Ml |
| Cream (Past. & Homo. –40% Fat) | 5.00 lbs | Mixed with water Water | 190 Ml 3.0 lbs |
| Water | 5.00 lbs | Total | 3.37 lbs |
| Antifoam Emulsion(SWS-2111) Controlled Quantity | | | |
| Cheese culture | 15 Ml | | |

Mixed the powder into the water, than slowly added the cream into the Groen kettle. Heated to 100° F. Ran well with curd setting up after about 30 seconds. Orifice size: 0.0015; Major pump: 1.25 GPM Minor pump: 0.15 GPM Pressure: 500 psi, pH of the curd was 5.90. Curd had nice consistency when cut and cooked in 100° F. water. Salted part of cooked curds before pressing 2.8 lbs. curd+0.1 lbs. salt. pH of salted curd after 24 hours was 5.19.

There resulted very nice curd formation, handled nicely for cutting and cooking. Curds were very solid and firm and pressed well, smelled like cheese, and could tell that culture was active. Finished cheese was very similar to fresh made cheddar cheese having a very cohesive elastic texture.

EXAMPLE 4

The same protein/oil/water mix as in Example 2 was converted by the same acid/enzyme stream but adjusted in acidity to produce an acid curd and coagulum. This run was made to reconfirm past records of acidification wherein if the pH is below the isoelectric point while curd is forming there results a coagulum that is distinctly different from that of Example 1 or 2. The product from the Sonolator does not after identical treatment shape up to qualify as a hard cheese. The curd showed weak cohesive properties and after cooking and pressing was characterized as having a weak structure.

EXAMPLE 5

Raw milk was received having a butterfat content of 3.55%. A total of 100 lbs. was pasturized in a large steam kettle at 145° F. and held for 30 minutes. Milk was then cooled to 130° F. Two feed streams were prepared to be separately fed to a dual feed Sonolator, a protein feed and an enzyme feed.

| PROTEIN FEED | ENZYME FEED |
|---|---|
| 100 lbs. Milk (3.55% BF) | 100 gm Lactic Acid(85% conc.) |
| 6 ml annatto color | 100 ml rennet |
| 10 ml conc. culture | 30 lbs. water |

These were then run though the dual feed Sonolator directly after their making with the culture added and mixed into the milk immediately before processing. Pump pressures were 700 psi with total GPM of 1.6 GPM. The Sonolated produced product was allowed to flow into a receiving steam kettle with the curd being mixed or slightly agitated by the flow into the kettle. After the feed streams were fed, the entire mass in the kettle was allowed to firmly set and equalibriate for 15 minutes. Thereafter the curd was cut while in the kettle and allowed to set for 10 minutes to allow whey separation and curd surfaces to heal. Temperature at this stage was 90° F. Then the curd and whey mixing was stirred and slowly heated to 100° F. During this cooking the curd acted like conventionally made cheese curd and if stirring was interrupted would sink and start massing together for 20 minutes. Then the curd was cut into three loaves and periodically turned until the acidity produced by the culture reached 0.26 (pH of 5.78). The curd was then cut into 1 inch pieces and salted prior to pressing. The pH after pressing was 5.2 comparing nicely with a large conventional batch made from the same milk and culture which had a pH of 5.17.

Thus it will be seen that I have provided a novel steady process for producing a cuttable enzyme curd which can be converted into an end cheese product.

It will further be seen that hard cheese products produced by this novel process have superior characteristics than commercial cheeses produced by the conventional cheesemaking processes.

Thus it will be seen that my novel process not only permits the formation of cheese products in a minimum of time and in a more efficient manner than any heretofore known processes, but also cheeses exhibiting specialized physical properties.

What is claimed is:

1. A steady flow process for first converting a fluid proteinaceous mix to a cuttable interstage enzymatic curd and thereafter converting the enzymatic curd to a desired end cheese product, comprising the steps of initially combining an accurately metered and proportioned, well mixed pumpable stream containing proteins, fats or oils, and an accurately metered proportioned well mixed pumpable acidified water stream containing an enzyme and non-enzymatic components by directing the streams through an orifice into an acoustic resonating chamber to immediately admix the streams and thereby form a turbulent jet stream having such kinetic energy that the turbulent stream entering the acoustic chamber produces cavitational and high sonic and ultrasonic waves and shearing forces all contributing to immediate homogenization and reaction of the stream components to thereby produce within one minute an enzymatic curd at a predetermined optimum pH above the isoelectric point.

2. The process as defined in claim 1 and thereafter cutting the enzymatic curd and subjecting the cut curd to acidification while in a warm water bath to lower the pH of contained proteins from the critical optimum curd forming pH to a pH below the isoelectric points of the contained proteins to form a hard cheese product.

3. The process as defined in claim 2 wherein the acidification of the enzyme curd below the optimum curd forming pH results from acid in the warm water bath.

4. The process as defined in claim 2 wherein the temperature of the water bath is approximately 100° F. and in any event is below denaturing temperature of the protein.

5. The process as defined in claim 1 wherein the enzymatic feed stream includes an acid producing bacterial culture, and the acidification of the enzyme curd below the optimum curd forming pH results from acid producing bacterial culture of the enzymatic feed stream.

6. The process as defined in claim 1 wherein vegetable fibers are added to the protein feed stream to improve structural as well as health properties of the enzymatic curd and an end cheese product resulting therefrom.

7. The process as defined in claim 6 wherein said fibers are starch crystallites whose dimensions are only a few microns.

8. The process as defined in claim 1 wherein the protein feed includes whole milk in its natural or concentrated form, and said enzymatic curd is converted to cheddar after post conventional processing and produces a hard cheddar cheese.

9. The process as defined in claim 1 wherein the protein feed stream comprises concentrated milk including milk powder or milk fractions obtained by separation, ultra filtration, or other fractionalization techniques and water and fats or oil, and the enzymatic curd produced which, after conventional processing and pressing, produces a hard cheese.

10. The process as defined in claim 1 wherein the acoustic resonating chamber has a vibratile element positioned in a confronting spaced relation to the orifice and vibrates in response to the kinetic energy transfered thereto from the turbulent jet stream to produce the cavitational and high sonic and ultrasonic waves and the shearing force which is transmitted to the stream material.

11. The process as defined in claim 10 wherein the pressure upstream of the acoustic resonating chamber is maintained at pressure generally within the range of 250 psi and 2000 psi, and the back pressure in the resonating chamber is regulated to peak the acoustic energy.

12. The process as defined in claim 11 wherein the spacing between the vibratile element and orifice may be adjusted in the acoustic chamber to peak the acoustic energy.

13. The process as defined in claim 1 wherein said protein containing stream includes milk protein having an isoelectric point at a pH of 5.2 or less, and said acidified enzyme stream includes a food grade acid at a concentration such that the enzyme curd produced and extruded from the acoustic chamber is formed at a pH above 5.3.

14. The process as defined in claim 1 wherein the hard cheese produced, by conventional processing of the curd, when subjected to a standard melt test exhibited minimal spread and uniformity as to shape and having a test score of less than 6.0.

15. The process as defined in claim 1 wherein the hard cheese produced when subjected to a standard melt test exhibited minimal oil separation as observed in standard melt test and in cheese drying test.

16. The process as defined in claim 1 wherein said protein and fat containing stream includes goat's milk, and wherein the curd is drained, cut and treated with salt including flake salt or a brine bath under refrigeration for an extended period of time producing a cheese of Feta characteristics.

17. The process as defined in claim 1 wherein the protein includes soy protein and the fat includes soy or other vegetable oils.

18. The process as defined in claim 1 wherein the protein containing stream includes an anti-foaming agent for preventing air/liquid foams or an emulsion both of which produce negative effects on enzyme activity and may produce undesirable curd properties.

19. The process as defined in claim 1 wherein the oil in the milk protein containing stream includes vegetable oil.

20. The process as defined in claim 1 wherein the enzyme curd is electrically heated by an electric heating medium to uniformly heat the curd and fluids associated therewith producing no thermal gradient therein and rendering a curd's syneresis complete in the shortest time, the curd being uniform in physical and chemical content after draining or other post treatment steps thereby rendering an improved product which is aseptic and does not require refrigeration after packaging.

21. The process as defined in claim 20 whereby the electric heating medium involves passing a current directly through the curd and is identified as Ohmic heating.

22. The process as defined in claim 1 wherein the protein containing stream comprises plant derived proteins and plant derived fats and oils.

23. The process as defined in claim 22 wherein proteins are derived from soybeans.

24. The process as defined in claim 1 wherein said protein feed stream includes flavors and fragrances to impart organoleptic properties to the curd.

25. A steady flow process for first converting a fluid proteinaceous mix to a cuttable interstage enzymatic curd and thereafter converting the interstage enzymatic curd to a desired end cheese product, comprising the steps of initially combining an accurately metered and proportioned well mixed pumpable stream containing proteins, fats or oils and an acid producing bacterial agent, and an accurately metered proportioned well mixed pumpable acidified water stream containing an enzyme and non-enzymatic components by directing the streams through an orifice into an acoustic resonating chamber to immediately admix the streams and thereby form a turbulent jet stream having such kinetic energy that the turbulent stream entering the acoustic chamber produces cavitational and high sonic and ultrasonic waves and shearing forces all contributing to immediate homogenization and reaction of the stream components to thereby produce and extrude within one minute an enzymatic curd at a predetermined optimum pH above the isoelectric point, and thereafter permitting the pH of the curd to be lowered by the action of the acid producing bacterial below the optimum curd forming pH to make a hard cheese product.

26. The process as defined in claim 25 wherein the extruded cheese product is dried to form cheese chips.

27. The process as defined in claim 25 wherein Italian type cheese mozzarella can be produced by treatment of the curd by conventional post treatments.

28. A steady flow process for first converting a fluid proteinaceous mix to a cuttable interstage enzymatic curd and thereafter converting the enzymatic curd to a desired end cheese product, comprising the steps of initially combining an accurately metered an proportioned, well mixed pumpable stream containing proteins, fats or oils, and an accurately metered proportioned well mixed pumpable acidified water stream containing an enzyme and non-enzymatic components by directing the streams through an orifice into an acoustic resonating chamber to immediately admix the streams and thereby form a turbulent jet stream having such kinetic energy that the turbulent stream entering the acoustic chamber produces cavitational and high sonic ultrasonic waves and shearing forces all contributing to immediate homogenization and reaction of the stream components and continually monitoring and maintaining the pH of the stream components above the isoelectric point thereof while maintaining the temperature of the stream components during reaction thereof below 45° C. or below the denaturing temperature of the particular protein to be converted to thereby produce within one minute an enzymatic curd at a predetermined optimum pH above the isoelectric point.

29. A steady flow process for first converting a fluid proteinaceous mix to a cuttable interstage enzymatic curd and thereafter converting the interstage enzymatic curd to a desired end cheese product, comprising the steps of initially combining an accurately metered and proportioned well mixed pumpable stream containing proteins, fats or oils and a acid producing bacterial agent, and an accurately metered proportioned well mixed pumpable acidified water stream containing an enzyme and non-enzymatic components by directing the streams through an orifice into an acoustic resonating chamber to immediately admix the streams and thereby form a turbulent jet stream having such kinetic energy that the turbulent stream entering the acoustic chamber produces cavitational and high sonic and ultrasonic waves and shearing forces all contributing to immediate homogenization and reaction of the stream components and continually monitoring and maintaining the pH of the stream components above the isoelectric point thereof while maintaining the temperature of the stream components during reaction thereof below 45° C. to thereby produce and extrude within one minute an enzymatic curd at a predetermined optimum pH above the isoelectric point, and thereafter permitting the pH of the curd to be lowered by the action of the acid producing bacteria below the optimum curd forming pH to make hard cheese product.

* * * * *